United States Patent
Freedman et al.

(10) Patent No.: US 9,942,253 B2
(45) Date of Patent: Apr. 10, 2018

(54) NETWORK MONITORING, DETECTION, AND ANALYSIS SYSTEM

(71) Applicant: Kentik Technologies, Inc., San Francisco, CA (US)

(72) Inventors: Avraham Tzur Freedman, San Francisco, CA (US); Ian Gerald Pye, San Francisco, CA (US); Daniel P. Ellis, West Pittston, PA (US); Ian Applegate, Lexington, KY (US)

(73) Assignee: Kentlik Technologies, Inc., San Francisco, CA (US)

( * ) Notice: Subject to any disclaimer, the term of this patent is extended or adjusted under 35 U.S.C. 154(b) by 0 days.

(21) Appl. No.: 15/404,623

(22) Filed: Jan. 12, 2017

(65) Prior Publication Data
US 2017/0208077 A1 Jul. 20, 2017

Related U.S. Application Data

(60) Provisional application No. 62/279,573, filed on Jan. 15, 216.

(51) Int. Cl.
| | | |
|---|---|---|
| *H04L 29/06* | (2006.01) | |
| *G06F 17/30* | (2006.01) | |
| *H04L 12/24* | (2006.01) | |

(52) U.S. Cl.
CPC ...... *H04L 63/1416* (2013.01); *G06F 17/3051* (2013.01); *G06F 17/30377* (2013.01); *G06F 17/30545* (2013.01); *H04L 41/04* (2013.01); *H04L 41/20* (2013.01); *G06F 2221/2111* (2013.01)

(58) Field of Classification Search
None
See application file for complete search history.

(56) References Cited

U.S. PATENT DOCUMENTS

| | | |
|---|---|---|
| 7,808,916 B1 | 10/2010 | Futamura et al. |
| 8,056,130 B1 | 11/2011 | Njemanze et al. |
| (Continued) | | |

FOREIGN PATENT DOCUMENTS

WO  2015051181 A1  4/2015

OTHER PUBLICATIONS

Alvaro A. Cardenas, Pratyusa K. Manadhata, Sree Rajan; Big Data Analytic for Security Intelligence; Cloud Security Alliance; Sep. 2013; online at downloads.cloudsecurityalliance.org/initiatives/bdwg/Big_Data_Analytics_for_Security_Intelligence.pdf.

*Primary Examiner* — Amir Mehrmanesh
(74) *Attorney, Agent, or Firm* — Fenwick & West LLP

(57) ABSTRACT

The Kentik Data Engine (KDE) is an integrated real-time, big data software system able to analyze what exactly is happening on a network at the present moment, and what happened on the network over the a prior period of time. KDE collects live operational data from computer network infrastructure devices (routers and switches) and computer hosts, consisting of multiple data types, categories, and protocols, and correlates them to analyze network activity and health. KDE does this in a lossless manner, meaning that it retains all raw data rather than summarizing or aggregating prior to storage. In this way, KDE provides a combination of precise, actionable information in real-time as well as a complete forensic data store for detailed exploratory analysis.

12 Claims, 5 Drawing Sheets

(56) References Cited

U.S. PATENT DOCUMENTS

| | | | |
|---|---|---|---|
| 8,504,879 | B2 | 8/2013 | Poletto et al. |
| 8,904,532 | B2 | 12/2014 | Jiang |
| 9,043,894 | B1 | 5/2015 | Dennison et al. |
| 9,083,741 | B2 | 7/2015 | Powers |
| 9,160,764 | B2 | 10/2015 | Stiansen et al. |
| 2002/0035698 | A1 | 3/2002 | Malan et al. |
| 2004/0205374 | A1 | 10/2004 | Poletto et al. |
| 2006/0117385 | A1 | 6/2006 | Mester et al. |
| 2007/0280123 | A1 | 12/2007 | Atkins et al. |
| 2010/0199345 | A1 | 8/2010 | Nadir |
| 2013/0174256 | A1 | 7/2013 | Powers |
| 2013/0305357 | A1 | 11/2013 | Ayyagari et al. |
| 2013/0322242 | A1 | 12/2013 | Swenson et al. |
| 2014/0157405 | A1 | 6/2014 | Joll et al. |
| 2014/0215621 | A1 | 7/2014 | Xaypanya et al. |
| 2015/0264077 | A1* | 9/2015 | Berger ............... G06F 21/554 726/23 |
| 2015/0373043 | A1* | 12/2015 | Wang ............... G06F 21/552 706/12 |
| 2016/0261624 | A1* | 9/2016 | Berger ............... G06F 21/554 |
| 2016/0315909 | A1* | 10/2016 | von Gravrock ......... H04L 63/02 |
| 2016/0315955 | A1* | 10/2016 | Beatty ............... H04L 63/1416 |

\* cited by examiner

NETWORK MONITORING, DETECTION, AND ANALYSIS SYSTEM

CROSS-REFERENCE TO RELATED APPLICATIONS

This utility patent application claims priority from U.S. provisional patent application Ser. No. 62/279,573, filed Jan. 15, 2016, titled "Network Monitoring, Detection, and Analysis System" by applicant Kentik Technologies, Inc.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017, Kentik Technologies, Inc.

BACKGROUND

Field of Technology

This relates to computer networks, and more particularly to real-time detection and analysis of network behavior.

Background

DESCRIPTION OF PRIOR ART

Network monitoring, analysis, and protection is a complex problem. Some existing solutions target distributed denial of service (DDoS) identification and mitigation. Example existing solutions include offerings from Black Lotus (now Level 3), Radware, Prolexic (now Akamai), Neustar, and Arbor Networks (now NetScout Systems).

Other existing solutions target monitoring network traffic and security. Example existing solutions include offerings from Renysys (now Dyn), ManageEngine, Plixer, Arbor Networks (now NetScout Systems), Deepfield, Lancope (now Cisco Systems), FlowTraq, NetScout Systems, Riverbed, CA Technologies, Thousand Eyes Intelligent Routing, Cisco, Noction Host Monitoring, Server Density, and Data Dog.

U.S. Patents

U.S. Pat. No. 9,083,741 (issued 2015 Jul. 14 naming inventor Powers for "Network Defense System and Framework for Detecting and Geolocating Botnet Cyber Attacks") discloses, in the Abstract, "A network defense system is described that provides network sensor infrastructure and a framework for managing and executing advanced cyber security algorithms specialized for detecting highly-distributed, stealth network attacks. In one example, a system includes a data collection and storage subsystem that provides a central repository to store network traffic data received from sensors positioned within geographically separate networks. Cyber defense algorithms analyze the network traffic data and detect centrally-controlled malware that is configured to perform distributed network attacks ("botnet attacks") from devices within the geographically separate networks. A visualization and decision-making subsystem generates a user interface that presents an electronic map of geographic locations of source devices and target devices of the botnet attacks. The data collection and storage subsystem stores a manifest of parameters for the network traffic data to be analyzed by each of the cyber defense algorithms."

U.S. Pat. No. 8,504,879 (issued 2013 Aug. 6 naming inventors Poletto et al. Powers for "Connection Based Anomaly Detection) discloses, in the Abstract, "A system for detecting network intrusions and other conditions in a network is described. The system includes a plurality of collector devices that are disposed to collect data and statistical information on packets that are sent between nodes on a network. An aggregator device is disposed to receive data and statistical information from the plurality of collector devices. The aggregator device produces a connection table that maps each node on the network to a record that stores information about traffic to or from the node. The aggregator runs processes that determine network events from aggregating of anomalies into network events."

U.S. Patent Application Publications

United States Patent Application Publication 2014/0157405 (published 3025-06-05 naming inventors Joll et al. for "Cyber Behavior Analysis and Detection Method, System, and Architecture") discloses, in the Abstract, "A scalable cyber-security system, method and architecture for the identification of malware and malicious behavior in a computer network. Host flow, host port usage, host information and network data at the application, transport and network layers are aggregated from within the network and correlated to identify a network behavior such as the presence of malicious code."

None of the above provides a networking monitoring, detection, and analysis system with (1) clustered architecture for real-time capture and analysis, (2) merged network flow, BGP, and other packet capture data, (3) current and historical pattern analysis, and (4) complete data retention for deep in-path analysis. What is needed, therefore, is a system that overcomes the above-mentioned limitations and that includes the features enumerated above.

BRIEF SUMMARY

The Kentik Data Engine (KDE) is an integrated real-time, big data software system able to analyze what exactly is happening on a network at the present moment, and what happened on the network over a prior period of time. KDE does this by collecting live operational data from computer network infrastructure devices (routers and switches) and computer hosts, consisting of several data types, categories, and protocols, and correlating them to form a multi-dimensional picture of network activity and health. This picture, and specific alerts that are generated when unusual activities or situations are recognized, help network engineers, network operators, and security operators take quick and decisive actions to protect and maintain normal operations. Unlike previous systems, KDE does this in a lossless manner, meaning that it retains all raw data rather than summarizing or aggregating prior to storage. In this way, KDE provides a combination of precise, actionable information in real-time as well as a complete forensic data store for detailed exploratory analysis.

As part of the intrinsic analytic capabilities of KDE, network anomaly detection is performed by combining tests during real-time data ingest with data queries against real-time and historical datasets to see which computing systems are talking to other computing systems across the network and to recognize and notify operators of unusual patterns of activity.

Network monitoring data is examined to reveal the detailed composition of network traffic, including legitimate activity as well as threatening traffic such as Distributed Denial of Service (DDoS) attacks, malware on network-connected computing systems, or botnets (coordinated groups of compromised computer systems).

There are four primary use cases for KDE.

1. Real-time monitoring of network activity, with immediate visibility into details of traffic composition for investigating, characterizing, and troubleshooting issues and incidents.

2. Automated, real-time alerting when unusual or anomalous activity is recognized, including both natural/organic problems as well as security threats or attacks.

3. Data-driven network engineering, by revealing traffic trends and showing correlated network traffic and network peering relationships (interconnected networks operated by other organizations or service providers).

4. Arbitrary scale queryable forensics repository, accessible on top of the same data store and system that supports network engineering, alerting, and monitoring functionality.

With Agent-based ingest, an Agent receives NetFlow/BGP and polls for SNMP locally on a customer Local Area Network (LAN). The agent then sends this data to the KDE ingest layer in KFlow format (an optimized, consolidated format explained below) via secure HTTP (HTTPS) to the KDE VIP (virtual Internet protocol address). The VIP leads to a KDE-local instance of a web server, which terminates SSL (secure socket layer protocol used for HTTPS). Each web server instance passes the data to an ingest proxy (iProxy), which de-multiplexes flow data to recognize and preserve details for each individual data source device. The iProxy then sends the data to one of many data servers, where data is saved to disk, and reference indexing information (device_id, time_period, host_name) is written to a MetaData System (MDS).

With Direct ingest, raw UDP NetFlow/sFlow/IPFIX packets are sent from monitored devices to a VIP. The VIP sends the received data to multiple iProxy instances, for load balancing and high availability. The iProxy de-multiplexes packets, sending all data from each individual source device to an appropriate instance of a processing proxy (pProxy). The pProxy launches an instance of a local Client (one per device) which then polls that device for SNMP data. Client instances also initiate BGP sessions with the source device, whereby the source device subsequently sends BGP packets directly to the Client. The Client forwards flow directly to server for writing to disk; the server then also adds indexing information to the MDS.

Data is retrieved from KDE for user interface presentation or automated analytics via the use of a Query. Each Query is initiated by sending a data request to Postgres (PG). PG takes the query and dispatches it to any available Master, using a round-robin or other selection algorithm. PG waits for a Master instance to acknowledge the query request. If no acknowledgement is received from the Master before timeout, PG considers that Master instance to be 'down' and it then dispatches the query to the next available Master. The Master takes the submitted query and divides it into a number of subqueries, with that number determined automatically based on the time interval and number of devices included in the query. For each subquery, the Master retrieves a list of possible query Worker instances from MDS. The Master then sends each subquery to the least-loaded Worker. Each Worker receiving a subquery first checks Cache, and returns data from the Cache if found. If not found in cache, the Worker pulls the requested data from disk (in which case, a copy of results are also stored in Cache). All results are then returned to the Master, which assembles the results of all subqueries and returns the final results to PG.

The KDE system features automated real-time alerting capabilities.

Clients and Proxies both forward flow data coming into them into the alert system as well as the MDS. KFlow data for each individual device is directed via HTTP to an Alpha process. Each Alpha process can handle multiple flow data streams from multiple devices.

The Alpha translates KFlow into Alpha flow, which is expressed as a data 'tuple' of the following composition: (SRC_IP, DST_IP, SRC_PORT, DST_PORT, PROTOCOL, BYTES, PACKETS, etc.). The system evaluates Key/Value (KN) pairs (such as SRC_IP+DST_IP→BYTES, SRC_IP→UNIQUE DST_IP, . . . ) that are identified by KDE users as being of interest. These K/V pairs are known as Betas. The Alpha process transforms Alpha flow into Beta flow. The highest value results are sent to the Beta process.

The Beta process unifies Beta flow as it comes in. All operations support Union—sum, or cardinality union for UNIQUE. The Beta process gets/writes history for all Keys, over a specific time range (i.e. 4 weeks). The Beta process then gets a current set of trigger events from the Trigger Set database. These are rules specifying when a key is considered to be in alarm state. Rules can be of many varieties, such as a fixed value (value>X) or based on comparison to a historical baseline value (value>95 percentile average for the same time of day, versus average of last 4 weeks). The Beta process writes out beta values in alarm to RaiseDB.

The Notify process is constantly polling RaiseDB. If a defined set of betas are currently in alarm (set of keys, for a specific period of time) then Notify will grab more information about the system from the PG head, and subsequently performs Notify actions. If the set of keys fall outside of the alarm criteria, Notify pushes an "all clear" event. If the set of keys continues to meet alarm criteria, Notify sends periodic updates noting this.

Features and Advantages

The KDE solution provides full resolution historical retention of raw data for extended periods. It further provides continuous, real-time anomaly detection that can recognize potential problems and actionable anomalies and raise alerts in seconds. KDE includes a fully open application programming interface (API) for integration with other management or data analysis systems. KDE may be implemented with fast deployment and minimal ongoing maintenance by virtue of a cloud-based Software as a Service (SaaS) delivery approach.

KDE uses a clustered, high performance, highly reliable three-tiered big data architecture to gather, store, and analyze massive volumes of data, allowing concurrent monitoring of multiple operational network infrastructures in real time.

The system merges flow data (call records from network routers, switches, or instrumentation such as NetFlow, sFlow, and IPFIX) with Border Gateway Protocol (BGP) data, HTTP logs, SNMP counters, SMTP logs, and other network activity data.

All collected data is recorded and maintained within a central columnar data storage system.

Domain name service (DNS) and Geolocation metadata is also retrieved and stored to further identify traffic patterns and potential malicious behavior occurring within the network.

Flow data gathered from network devices and/or generated via packet capture/decode is stored at full resolution within KDE, meaning there is no summarization or aggregation prior to long term storage.

Modified flow data records are used to index the data to provide access to relevant or interesting points within the flow of data in a rapid fashion, regardless of the total volume of data being captured/stored.

Users can select data points (via a User Interface Portal) relevant to them or those heuristically pinpointed to see detailed information on packets and traffic flowing through the network, and then drill down into successive levels of detail using filters or custom queries.

KDE enables deep in-path analysis, which means that no information is lost. KDE does not perform aggregations of data at ingest time and then throw out the original inputs. Instead, the system performs aggregation at query time. In this way, the exactly correct answer can be provided for any question asked of the data at any time.

The KDE system, by virtue of support for collecting both flow record data and other complementary data sources such as BGP, performs analyses and data presentations of high value to network operators, planners, and architects.

The KDE system is multi tenant. As such, logic exists that prevents users from accessing data that does not belong to their account, and individual users are unable to substantively affect the query performance of any other users in the system. Additionally, KDE prevents users' queries from taking an 'unfair' amount of system resource, by rate-limiting the number of simultaneous sub-queries active per query.

The KDE system is self leveling, sending work to the least loaded worker, via a greedy local knowledge algorithm, not requiring a central system for tracking global state.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Figure 1A:
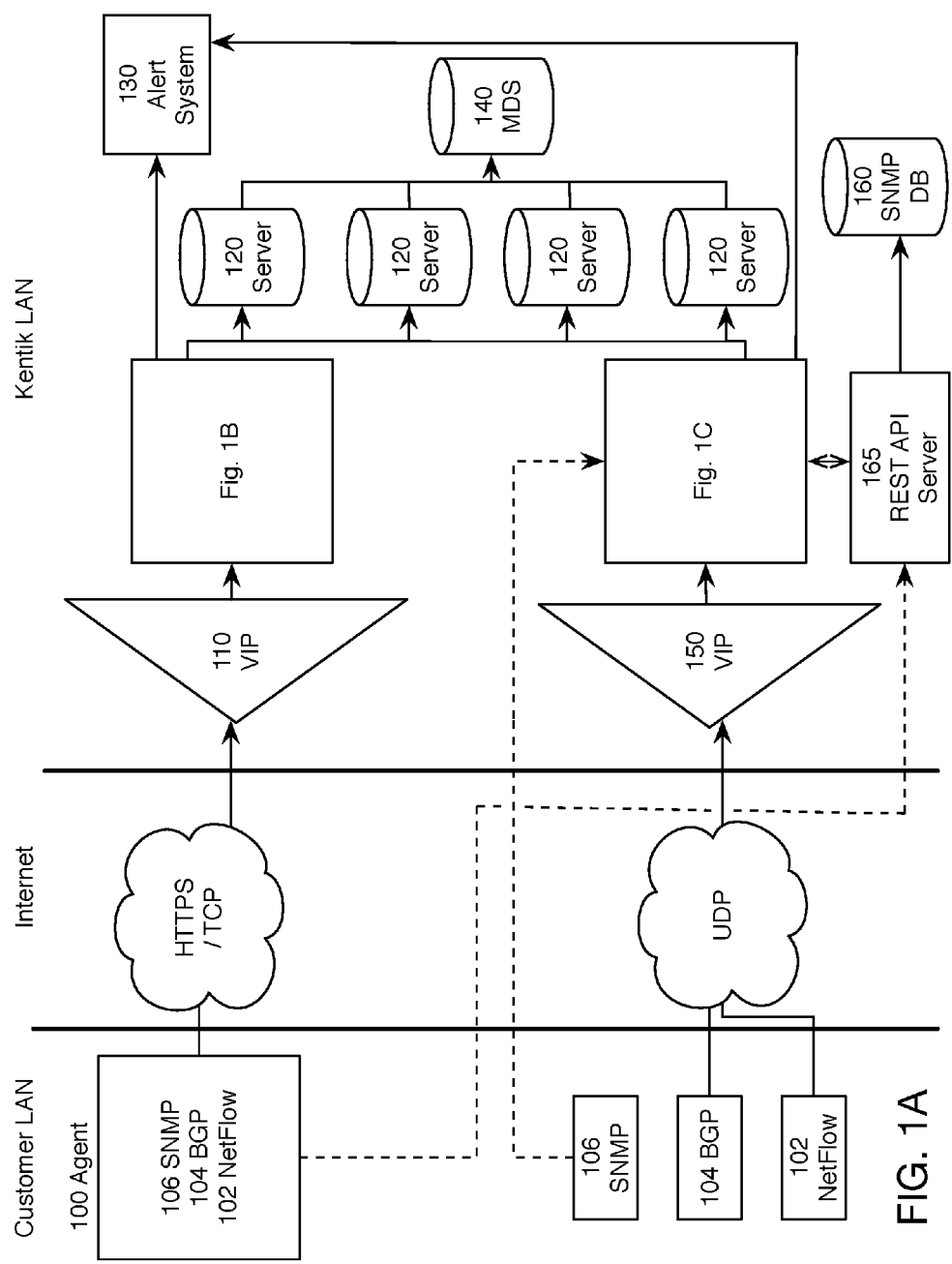
FIG. 1A is a chart illustrating the data ingest architecture for the system.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present invention.

Terminology

The terminology and definitions of the prior art are not necessarily consistent with the terminology and definitions of the current invention. Where there is a conflict, the following definitions apply.

Network: A set of computers which can all exchange information and do not share disks or memory.

Host: A computer which is connected to a network. A host directly receives and transmits traffic across the network.

Traffic: A set of bits, collected together into a series of network packets, each of which are transmitted as individual units from a single source host to one or more destination hosts.

Network Device: A router or switch. A network device does not generate or terminate traffic, but rather passes traffic it receives on to an appropriate destination.

Flow data: At a minimum, the 5-tuple (Source IP, Destination IP, Source Port, Destination Port, Protocol) uniquely identifying traffic between two hosts at an application level. Additional information can also be included, such as number of bytes and number of packets sent.

IP: Internet Protocol Address. IP can be either version 4 or version 6 format.

KFlow: Encoding format for flow data which is unified with all other KDE source information.

Alpha flow: Individual KFlow records.

Beta flow: A Key/Value pair, with timestamp and time duration. Beta flows typically encompass many alpha flows and provide a more intuitive way for users to express reaction logic. A Key is either a single KFlow field or else a compound set of fields (Destination IP, Destination IP+Source Port+ . . . ). A Value is either a simple scalar number or set cardinality (sum of bytes, unique Destination IPs). Timestamp in the Beta flow is the time the first Alpha flow was added. Duration is the length of time from first Alpha flow to last Alpha flow.

Activated: State of a Beta flow that causes KDE to record the Beta flow into a secondary data store.

Trigger Set: Rules for when a given Beta flow is determined to be Activated into "alarm state." This can be either an absolute test (value>X) or a relative test (value>p95 recorded value for key, for last Y weeks). Alarm State can be one of many levels (i.e. WARNING, CRITICAL, INFORMATIONAL).

VIP: Virtual IP. This allows one IP address to be assigned to multiple servers, to allow for fault tolerance.

RaiseDB: Time series database containing all of the times that a given Beta flow became activated.

Operation

In a preferred embodiment the Kentik Data Engine (KDE) is implemented in the go, c, and c++ languages. The target architecture is amd64. The target operating system is Debian Linux.

Ingest: Protocols, Methods, Capture

Figure 1B:
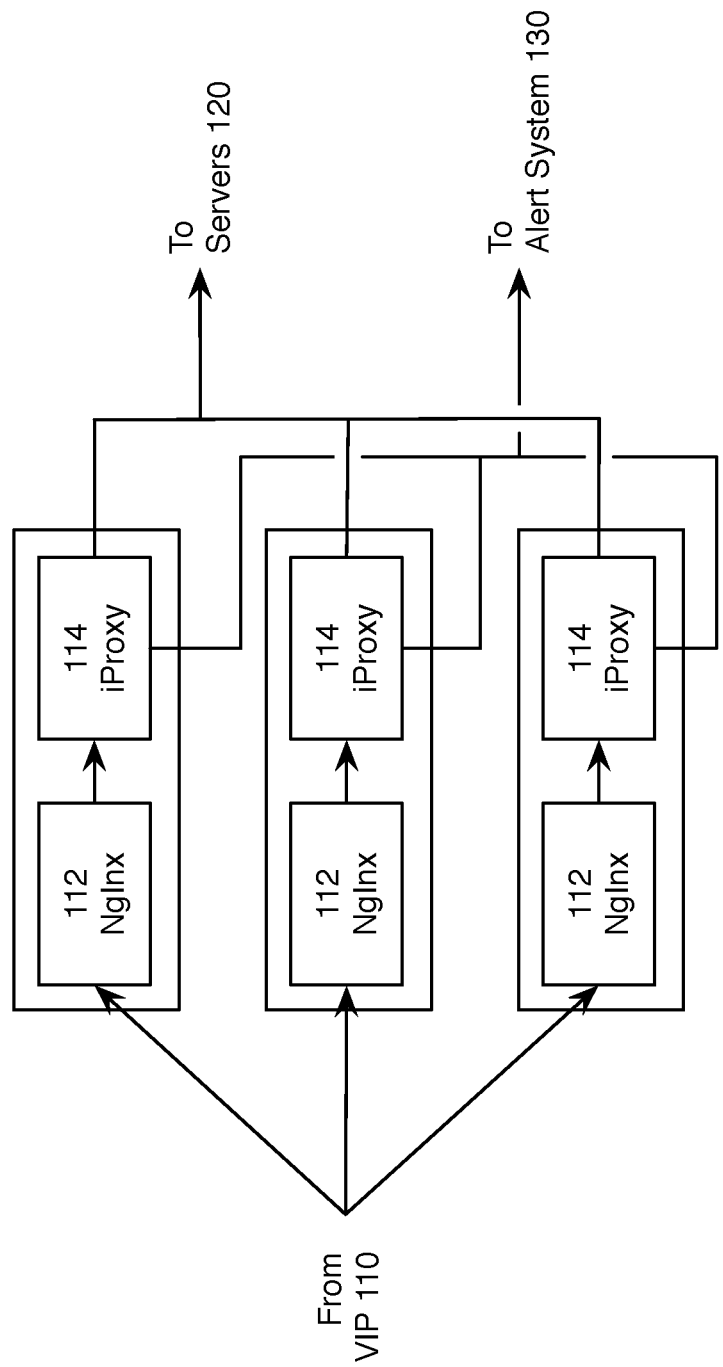
FIG. 1B is chart detailing the agent-based ingest portion of FIG. 1A.
Figure 1C:
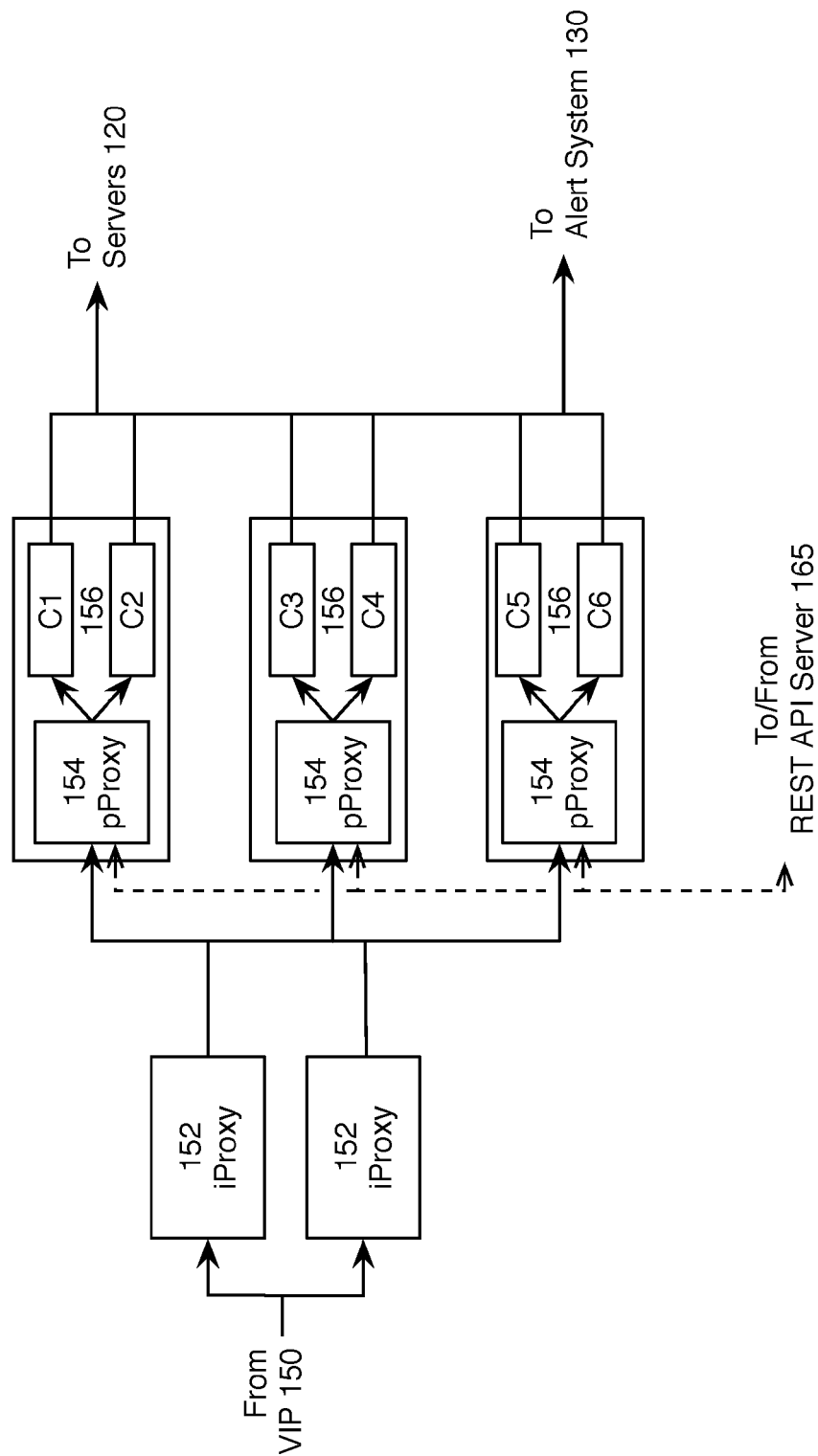
FIG. 1C is a chart detailing the direct flow ingest portion of FIG. 1A.

Referring to FIGS. 1A, 1B, and 1C, there are two major modes used to harvest and present data to the KDE back end: Agent and Direct. The KDE back end is later described, and provides an application programming interface (KDE API) for communication across the internet via transmission control protocol (TCP) and secure hyper text transfer protocol (HTTPS) for Agents, or user datagram protocol (UDP) for direct data.

Agent-Based

The Agent 100 is software that a KDE user downloads. It is installed and runs in the user's Local Area Network (LAN), typically on a dedicated virtual machine (VM)

although it may be run on any computer system within the network. Preferably the Agent is a stand alone software program, but it alternatively may be a library statically or dynamically linked into other executing software. The Agent opens an unreliable datagram protocol (UDP) socket and listens for flow data 102. On receiving flow data, the Agent queries the KDE API and looks up device information based on the sending IP address. If device information is found, the Agent forks itself, creating a child process that is then dedicated to receiving and processing flow data from that single unique device. One parent Agent may launch many child processes in this way.

The child process receives flow data relayed via its parent and also loads several routing tables. Related data from the routing tables is then added to the flow data based on IP addresses contained in the flow data. Examples of added information are City/State/Country level geographic location, autonomous system number (ASN) ownership, and threat score.

The child process also will launch a Border Gateway Protocol (BGP) daemon 104. The daemon peers with the network device which that child process is managing. BGP route information is then pushed from the network device to the BGP daemon. Route data is then pushed from the BGP daemon into the child process, and is added to another table. From this table, BGP information is added to each flow data record, based on Source and Destination IP addresses.

The child process may also perform reverse domain name service (reverse DNS) queries using a user-defined DNS server. With this technique, the child process can also store DNS record names for IP addresses it sees and include that data in flow data records it processes.

Additionally, the child process polls its related device for simple network management protocol (SNMP) data 106. This includes descriptive information regarding the device and the device's interfaces, as well as counters for bytes, packets and errors seen for each interface. This data is POSTED to the KDE API for storage.

Once every one second or every 40,000 stored flows (whichever is first) the child process POSTs all accumulated flow data information to the KDE ingest layer. These trigger points are chosen for performance reasons, but may be implemented as different values (such as, for example, every other second or every 20,000 stored flows). This is done via an HTTPS connection (which provides SSL encryption) via a serialized wire format utilizing KFlow. Every device is limited to exporting a fixed or defined maximum number of flows per second. If the limit is exceeded, excess flows are dropped and the sample rate for kept flows increased accordingly to preserve the sample adjusted byte and packet total for each second.

Additionally, a separate process in the agent child gets a copy of each KFlow record, which is added to a special data set for accumulation and resampling every 60 seconds (or other preconfigured interval), resulting in a single FastKFlow record. FastKFlow records are forwarded to the KDE ingest layer for storage, and are used for longer term (time ranges>1 day) queries.

KFlow records are directed to a VIP 110 which is used to represent the full pool of ingest servers 112. On each ingest server, a web server process first accepts the data transmission request and terminates the SSL connection. It passes the request to an ingest proxy (iProxy) process 114, which validates the source device to affirm that the Agent is licensed/eligible to receive/store flow data. The iProxy then re-validates the flow rate for the given device, dropping any flows which exceed licensed/acceptable rates. The iProxy then looks up current data servers 120 storing flow for the device, and passes accepted KFlow packets on to those data servers.

The iProxy also sends a copy of every finished KFlow record into the alert subsystem 130. Finished means that all additional data sources such as BGP, GeoIP, and tagging have been added to the record.

A data server process writes data from each KFlow record to disk. Additionally, an index process computes metadata for each time interval. It writes this to a MetaData System (MDS) server 140, which is used at query time to direct queries to local copies of data. MDS indexing consists of time rate, device identifier, and local server name.

Direct Mode

In direct mode, flow data 102 is sent as UDP packets directly from routers to the VIP 150 that is used to reach the KDE ingest server pool. These UDP packets are passed to an iProxy instance 152, which validates the sending IP and provides a first layer of defense against volumetric attacks. Flow data for any given device may be spread across many iProxy instances. The iProxy then passes the flows again via UDP to a second set of pProxy servers 154. Here, all flows for a given device are sent to a single pProxy instance.

The pProxy launches a Client process 156 for each distinct device seen. This Client functions like the child agent process used for Agent data processing (above). The Client gathers and integrates BGP, DNS, and SNMP data, and handles FastKFlow data set flow unification. The Client sends finished KFlow records directly to the device's assigned data servers 120, bypassing an additional trip through the proxy layer.

Clients also send a copy of every finished KFlow into the alert system 130.

With both Client and Direct intake, BGP data 104 is unified with flow data for each source device for storage in the MDS 140. SNMP data 106 is stored separately in parallel, in an independent database 160 via the KDE API 165.

KFlow Structure

KFlow is a templated format for network flow data similar to Internet Protocol Flow Information Export (IPFIX, which is an industry standard) and NetFlow version 9 (a format offered by Cisco Systems). KFlow templates are registered with the KDE and are defined by a unique name and ID. Some templates are public and may be used by any customer. Others are private and may only be used by a single customer. Customers may create any number of custom templates, and all devices for a given customer must accept and use the same set of template structures.

Each KFlow sent is thus a list of pairs: <Template ID, Flow Value>. Value is a union which supports integer, float, text and blob data types. The Cap'n Proto data exchange library is used to serialize and compress each KFlow. Additional common fields are also present in the KFlow structure, including Customer ID, Device ID and flow creation time.

The server process keeps all currently defined templates in memory. For each flow which is seen, it validates the template ID and translates this to a string value, which is the template name. This template name is also the column name used to store this data and subsequently to access this data via structured query language (SQL) or API interfaces.

Storage: How KDE Manages Data

The KDE back end, as later described, is preferably implemented on clustered servers. A server process listens on each node for HTTP POST requests, which indicate an inbound KFlow data record. As it receives these, the KFlow records are sent to a per-device thread. Once every second (or other preconfigured interval), this thread writes out any KFlow records that have been received. It writes each twice, once for per-second buckets of data stored in memory, and once for per-minute data. It also receives FastKFlow, which is written out only once.

After writing a block of data, the server process notifies an index process. There is one index process per interval range (sec/min/fast). This process waits until the interval is over, and then computes a b+tree over all columns. It then moves the data and index files into their proper place on disk.

Additionally, the index process records that the data is ready in the MDS. This may be a single table recording host name, device id, interval start time, and interval duration.

A delete process runs on every storage node as well. It deletes data across the system which is older than the user's retention policy.

Analysis: Range, Heuristics, how to Pull Data Out of KDE
How Query Works

Figure 2:
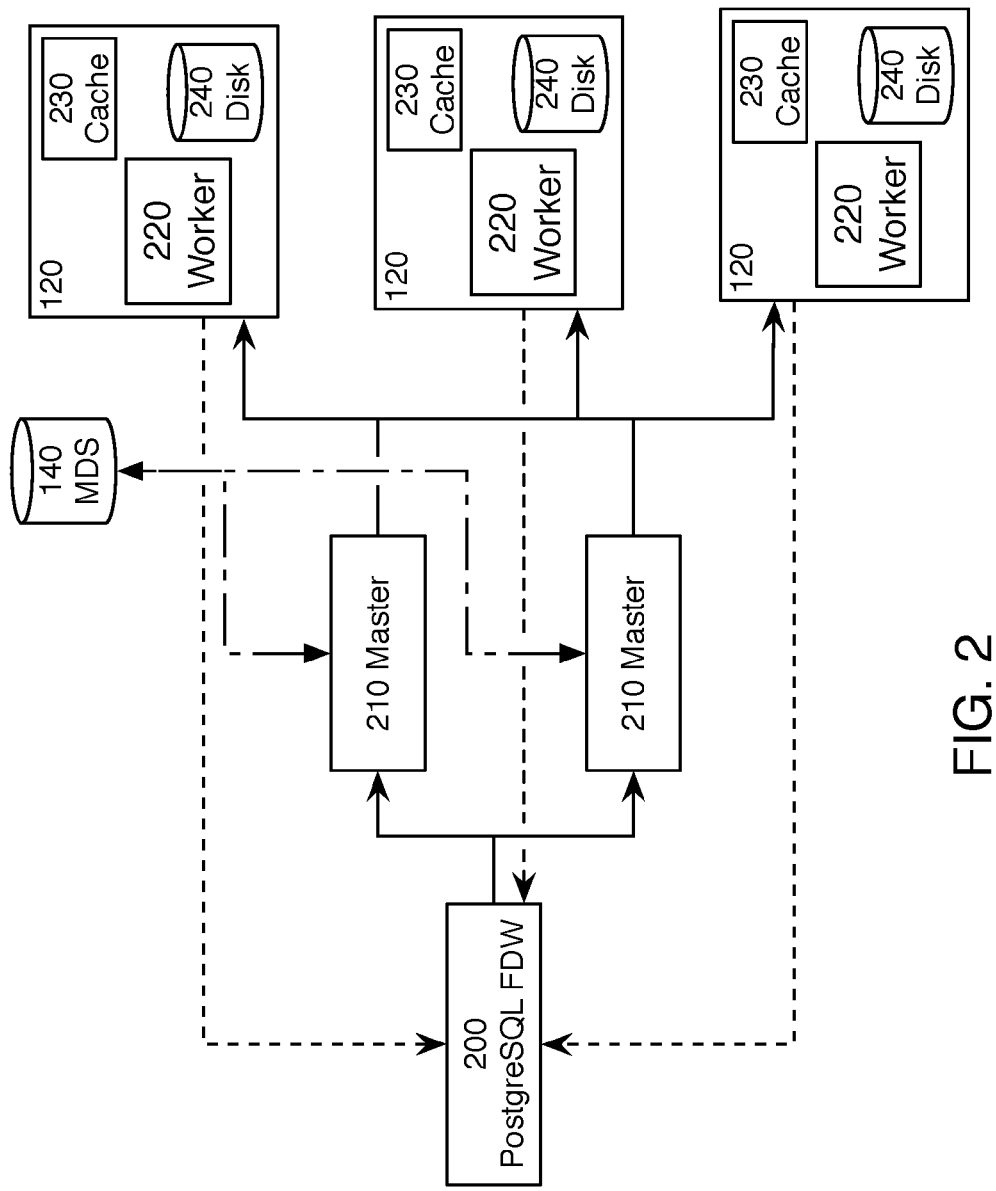
FIG. 2 is a chart illustrating retrieving data from the system.

Referring also to FIG. 2, requests for data from within KDE can be generally considered a 'Query.' A Query is typically begun with a structured query language (SQL) query from a user. Typically this is through a web portal or other user interface, but may be from any SQL source. The SQL query is preferably for Postgres (PG) database format 200, but alternate database formats may be used. The query is sent to a local Proxy, which sends it to an available Master process 210 selected based on a least recently used (LRU) or equivalent selection algorithm. The Master process breaks the query up into subqueries, resulting in one subquery per device per time interval covered by the query. For example, if the customer has three devices, querying for one hour, this results in 3*60=180 subqueries. For each subquery, the Master looks up which storage servers contain the particular device and time interval combination via the MDS 140. The Master then sends each subquery to the least loaded available storage server. Least loaded is determined by the fewest queries outstanding locally to that storage server, and is used to maximize performance. A Worker process 220 on each storage server receives subqueries. The Worker process first checks a "query fragment result" cache 230 to see if requested data resides there, and returns results from cache if so. If not, the subquery is enqueued for further processing. A second thread in the Worker process reads this queue. It takes each subquery, retrieves the requested data from disk 240, and returns the result back to PG 200. It also saves the result to local cache 230, for faster retrieval in the future. The cached results are then copied to additional nodes to keep the system running if nodes fail.

Analytics/Alerting

Figure 3:
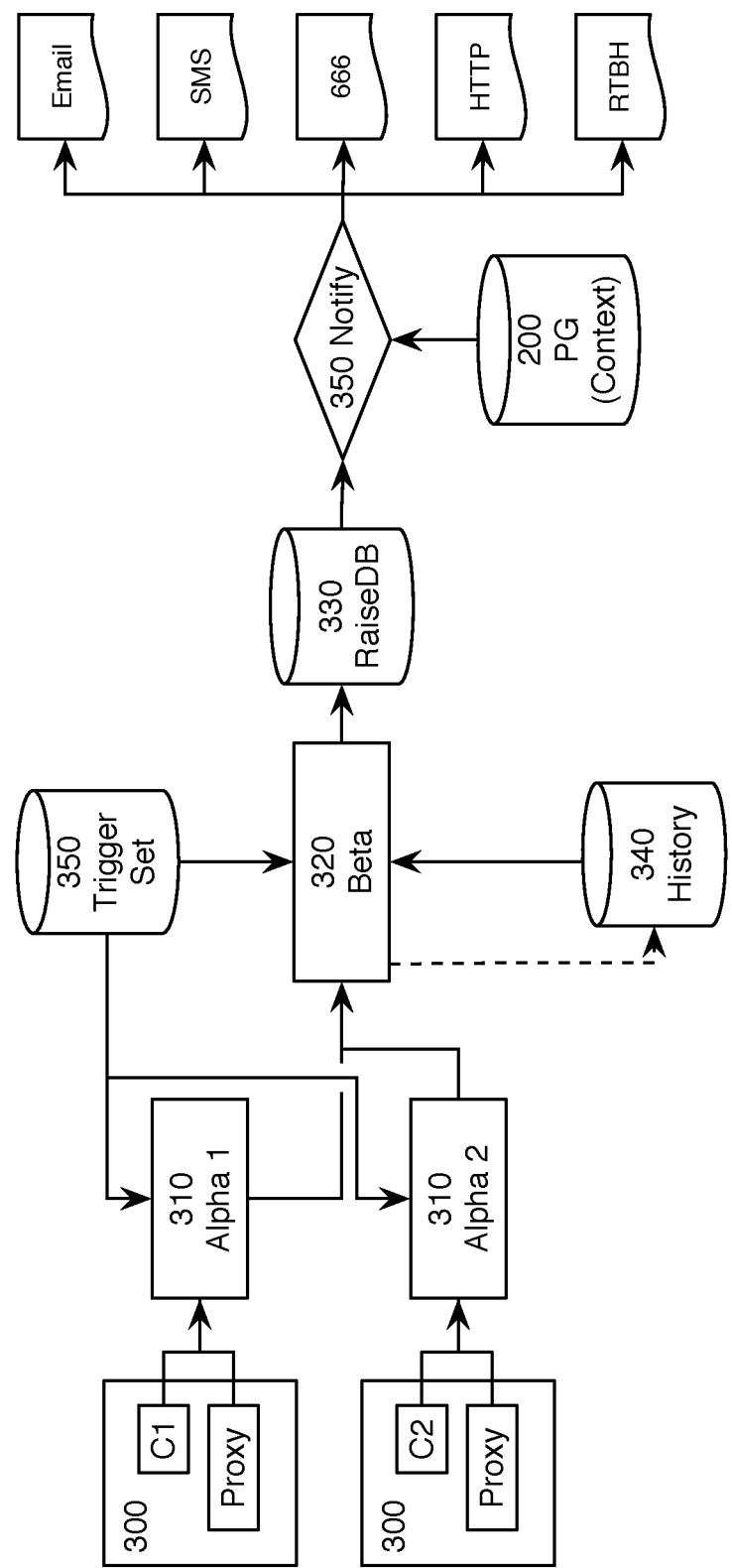
FIG. 3 is a chart illustrating alert generation.

Referring also to FIG. 3, alerting works by examining each recorded flow, unifying it with a more complete vision of the network before an action is taken. A copy of every KFlow generated is sent to a set of alert ingest nodes 300. The first stage of these are in charge of reducing the inputs from Alpha flows 310 to Beta flows 320. A company's flow is shared across all available ingest processes. However, all flow for a given company on a given alpha ingest process is collapsed down into one stream of beta flows.

Beta processes retrieve a custom set of beta comparators for each company by polling Postgres.

On a regular time interval (preferably ranging from 1 sec to 30 sec, depending on latency requirements and user definition), then-current beta flow sets are dumped to the second tier Alert process. Here, all beta flow sets for a given company are directed to one common Process. This Process unifies beta flow sets and evaluates current beta flow sets every interval. To save space, only the top 'n' Keys by Value are kept. If any K/V (key/value) pairs exceed defined levels, they are activated as "in alert state", and are written to the Activation database (ActivationDB) 330.

This process also writes a history for every observed beta flow set out to a History database (HistoryDB) 340. The HistoryDB is updated on a separate cycle, for example every 60 min. Values from the HistoryDB are used as a basis for assessing KN value departures from long-term baseline thresholds.

A Notify process 350 polls the ActivationDB every fixed time period. A user may specify notification actions, such as send data to a URL via HTTP, send email, send SMS, integrate with third party APIs, integrate with 3rd party DDoS mitigation vendor APIs, perform a local host action, or instruct linux IP tables to add/remove rule. Before doing this, it runs a set of SQL queries to get more detail on what is happening on the user's network. An example of one of these such queries is:

WITH subquery AS (SELECT ipv4_src_addr, ipv4_dst_addr, i_device_name, src_geo, src_geo_region, src_geo_city, round(sum(both_pkts)/% lookbackseconds %) as f_sum_both_pkts, round(sum(both_bytes)*8/% lookbackseconds %) as f_sum_both_bytes FROM all_devices WHERE dst_flow_tags LIKE '% TAKION_VIPS %' AND ipv4_dst_addr='% key %' AND ctimestamp>% lookbackseconds % GROUP BY ipv4_src_addr, ipv4_dst_addr, i_device_name, src_geo, src_geo_region, src_geo_city HAVING sum(both_pkts)/% lookbackseconds %>2 or sum (both_bytes)*8/% lookbackseconds %>1000 ORDER BY f_sum_both_pkts DESC limit 500000) SELECT 'fake' as_key_, ipv4_src_addr, ipv4_dst_addr, i_device_name, src_geo, src_geo_region, src_geo_city, f_sum_both_pkts as pps, f_sum_both_bytes as bps from subquery WHERE ipv4_src_addr IN (SELECT ipv4_src_addr FROM (SELECT ipv4_src_addr, sum(f_sum_both_pkts) as pps, sum (f_sum_both_bytes) as bps FROM subquery GROUP BY ipv4_src_addr HAVING sum(f_sum_both_pkts)>2 or sum (f_sum_both_bytes)>1000 ORDER BY ipv4_src_addr DESC) a);

This query provides information on Source IP, destination ID, device_name, Source Country, Source City, and Source State for the top 1,000 such tuples by packets sent.

A user can define alert criteria, either by singular scalar value check or by grouping keys together, along with a number of activations in a given time period (for example, K1 AND K2 exceed value X, seen three times in last 90 seconds). These are called Trigger Sets and stored in Trigger Set database 350. Once this criteria is met, an alert is established and the corresponding notification action is taken. This alert is then placed in ALARM mode.

For all alerts in ALARM, the Notify process polls the ActivationDB to determine whether or not to automatically clear the alert. If a 'clear' period of time has been exceeded without any further notifications, the Alert is cleared. The user sets a policy of either allowing the Alert go directly back to CLEAR state, or else into an 'ACKNOWLEDGEMENT REQUIRED' state that requires user action before releasing the alert to return to CLEAR state.

Scalability

The KDE back-end system is designed to scale horizontally at all points. The basic unit of planning and architecture is the volume of flows from a single given device at a predefined maximum full flow rate expressed in flows per second ("1U"). Every process in KDE is optimized to be able to handle at least 1U worth of flow. To make sure any single device does not exceed 1U, flow records are resampled at the client/agent level, discarding flows which exceed 1U. Each one-second time interval is evaluated for resampling independently, without reference to previous intervals.

Since each process can handle up to 1U of flow, extending the scale of the system is a process of adding more compute system hardware so that more processes can be hosted and executed.

KDE system clusters run on a static set of computing hardware. A central service monitors this computing hardware and all processes on it. In order to add new capacity for data collection/storage/querying, new computing hardware is installed and provisioned, including KDE software. Once up and running, the new software processes are identified to the central monitoring service, which adds the new processes to the available resource cluster and immediately begins sending work (Ingest/Query/Alert) jobs/flows to the new processes. Upon failure of any process that is a member of a KDE cluster, the central monitoring service automatically removes that resource from the available cluster and work is redistributed across the remaining processes.

Fan out flow scaling (for distributing incoming/collected flow data) is accomplished using an abstraction and assuming that all devices generate the same amount of flow. Whenever a new flow is seen, this traffic is directed to the least loaded node of each class (ingest server or data server).

Fan in scaling (for query and alert) is facilitated because raw inputs (KFlows) are reduced to much smaller result sets. Each KFlow describes a single event, while result sets summarize multiple events. For queries, use of aggregate values (i.e. "sum(bytes)") and "group-by" methods for collecting by a common shared metric value (i.e. protocol, port) reduces the size and volume of data that is returned to requesting clients. The same holds for alert scaling, where only the highest "n" betas are evaluated. To get these highest sets, probabilistic algorithms including count-min sketch and hyper-log-log are used.

Network Peering Analytics

By correlating and enriching flow data with BGP and geographical IP information, users of the KDE can recognize how their traffic is flowing across not only their own network but also across the network to which they are connected and via which they reach customers and users across the Internet. A graphical presentation of this data facilitates rapid visual recognition of a number of key issues. Such presentation may identify where opportunities exist to improve both operational and revenue relationships between network operators, based on actual usage and flow of traffic; which network operators offer the best or most common path to reach specific geographic populations of users; where traffic patterns are not behaving as expected, and require corrective action via routing definition changes; as well as other information.

Other Embodiments

By virtue of the extensible design used, the KDE may be enhanced with additional functions and capabilities. Certain additional functions and capabilities are discussed in the following alternate embodiments, which may be implemented separately or in any combination.

In an alternate embodiment, the KDE may automatically perform direct control actions on network devices based on observed anomalies, to protect or restore normal network function. For example, when a DDoS attack is recognized, routing changes may be instituted to discard unwanted traffic, or redirect traffic to an on-premises or cloud-based scrubbing service. As alternative approach after recognizing a DDoS attack, the KDE system may generate firewall rules or router access control list (ACL) updates to effect similar results.

An alternate embodiment may include a broader set of data source types, such as system logs (syslog) or application programming interface (API) feeds and then include those in existing or purpose-built anomaly detection and analytics functions.

An alternate embodiment may perform deep packet inspection (DPI), using streaming or stored network packet capture (PCAP) files to add application level metrics and information to existing network level data.

An alternate embodiment may facilitate data sharing across multiple users. For example, the KDE may leverage a single inbound security threat feed from a security research organization that identifies malicious IP addresses, and automatically make alerts against those IP addresses available to any and all KDE user subscribers.

An alternate embodiment may provide a "state of the Internet" report showcasing trends observed across time, geography, or other classification. For example, IPv6 adoption may be increasing at a certain rate (XX %) Year over Year (YoY) overall, but at a different rate (YY %) in China, or systemic performance issues being experienced by a common carrier or service provider may impact service across multiple subscribers.

An alternate embodiment may provide reporting and/or auditing to verify that a network is in a clean state and that only expected traffic is present going to and from expected computing systems. This can be used for performing due diligence. A time slice of a network's activity is ingested into KDE, which then performs a set number of queries to identify malicious activity, including communicating with unspecified systems or using unsanctioned protocols. If no results are found, the network is deemed secure and healthy.

An alternate embodiment may generate network peering recommendations automatically by applying heuristic evaluations of peering traffic patterns and/or alerting network operators when specific problematic situations occur.

Users may interact with the KDE system through a web-based user interface portal, or via specific software or applications implemented to interact with the KDE system through the KDE API. User accounts may be associated with specific networks, and may have varying permissions set allowing one or more of query access, creating Trigger Sets, and defining network-specific KFlow structures. Users may also directly interact with the KDE system via a PostgreSQL client connection.

The methods and systems described herein may be implemented in hardware, software or any combination of hardware and software suitable for a particular application. The hardware may include a general purpose computer and/or dedicated computing device or specific computing device or particular aspect or component of a specific computing device, including mobile computing devices such as, but not limited to, cell phones, mobile phones, mobile personal digital assistants, laptops, palmtops, netbooks, or tablets. The processes may be realized in one or more microprocessors, micro-controllers, embedded micro-controllers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

The methods and systems described herein may be deployed in part or in whole through network infrastructures. The network infrastructure may include elements such as, but not limited to, computing devices, servers, routers, hubs, firewalls, clients, personal computers, communication devices, routing devices and other active and passive devices, modules and/or other components. The computing and/or non-computing device(s) associated with the network infrastructure may include, apart from other components, a storage medium such as, but not limited to, flash memory, buffer, stack, RAM, or ROM.

The computer software described herein may be stored and/or accessed on machine readable media that may include: computer components, devices, and recording media that retain digital data used for computing for some interval of time; semiconductor storage known as random access memory (RAM); mass storage typically for more permanent storage, such as, but not limited to, solid state drives, optical discs, forms of magnetic storage like hard disks, tapes, drums, cards and other types; processor registers, cache memory, volatile memory, non-volatile memory; optical storage such as CD, DVD; removable media such as flash memory, floppy disks, magnetic tape, standalone RAM disks, removable mass storage, other computer memory such as, but not limited to, dynamic memory, static memory, read/write storage, mutable storage, read only, random access, sequential access, location addressable, file addressable, content addressable, network attached storage, or a storage area network.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a clustered architecture real-time network traffic capture and analysis, comprising:
    operating a Kentik Data Engine (KDE) on clustered computer server hardware;
    transmitting network flow and Border Gateway Protocol (BGP) data to the KDE from Agent software operating on a virtual machine within the computer network, or directly from router devices within the computer network, or both from Agent software and directly from router devices;
    listening, by the Agent software, to User Datagram Protocol (UDP) traffic on the computer network;
    querying, by the Agent software, the KDE for device information identified in the UDP traffic;
    forking a separate Agent process for each unique device detected in the UDP traffic;
    transforming, by the separate Agent process for a unique device, UDP traffic for the unique device into the one or more Kflow records, each Kflow record associating one or more templates with one or more network flow data values;
    launching, by the separate Agent process for the unique device, a BGP daemon for the unique device;
    polling, by the Agent process, network devices on the computer network for Simple Network Management Protocol (SNMP) data;
    merging, by the Agent process, BGP data collected by the BGP daemon and SNMP data into the one or more Kflow records;
    posting the one or more Kflow records over the internet from the Agent software to a Virtual Internet Protocol (VIP) address of the KDE;
    transmitting, from a router device within the computer network, UDP data to the VIP of the KDE;
    initiating, by the KDE, a KDE child process for the router device;
    transmitting, from the router device to the KDE child process, BGP data;
    gathering, by the KDE child process, domain name service (DNS) data and SNMP data of the router device;
    integrating, by the KDE child process, the UDP, BGP, DNS, and SNMP data into the one or more Kflow records;
    compiling a preconfigured interval of Kflow records to form a FastKFlow record, and storing the FastKFlow record for historical analysis;
    indexing metadata about Kflow records into a metadata system (MDS) based on a time interval, a device identifier, and a local server server name;
    receiving a Structured Query Language (SQL) query;
    breaking the SQL query into one or more subqueries such that there is one subquery per device per time interval covered by the SQL query;
    identifying, through the MDS, one or more storage servers containing data records for the particular device and time interval of each subquery;
    sending each subquery to an identified, available, and least loaded storage server;
    checking, by each storage server, for relevant subquery results in a server cache, and, if not in the server cache, queuing the subquery for retrieving results from disk;
    updating, by each storage server, the storage server cache for retrieved results and copying the cached results to any additional nodes in the clustered computer server hardware;
    processing Kflow records into an alpha flow of data tuples comprising at least a source IP address, a destination IP address, a source port, a destination port, a protocol, a number of bytes, and a set of packet data;
    processing the alpha flow into a beta flow of key value pairs;
    comparing beta flow to one or more trigger rules for alert conditions based on values for given keys in the trigger rules;
    processing a top set of keys by value for retention;
    writing a history of retained beta flows to a history database on a large time period interval of one hour or longer; and
    identifying deviations in beta flow values of the retained beta flows with values in the history database for alerts from historical usage patterns separately from trigger rules.

2. A method for a clustered architecture real-time network traffic capture and analysis, comprising:
    operating a Kentik Data Engine (KDE) on clustered computer server hardware;
    receiving, across the internet at the KDE, network flow and Border Gateway Protocol (BGP) data from a computer network, wherein the network flow and BGP data is transmitted to the KDE from Agent software operating on a virtual machine within the computer network, directly from router devices within the computer network, or both from Agent software and directly from router devices, and wherein receiving the network flow and BGP data directly from router devices comprises:
  receiving, from a router device of the router devices within the computer network, User Datagram Protocol (UDP) data sent to a Virtual Internet Protocol (VIP) address of the KDE;
  initiating, by the KDE, a KDE child process for the router device;
  receiving BGP data from the router device sent to the KDE child process;
  gathering, by the KDE child process, Domain Name Service (DNS) data and Simple Network Management Protocol (SNMP) data of the router device; and
  integrating, by the KDE child process, the UDP, BGP, DNS, and SNMP data into the one or more Kflow records;
polling Hyper Text Transfer Protocol (HTTP) logs, SNMP data, DNS data, and geolocation data, related to the computer network;
merging the received and polled data into one or more Kflow records, each Kflow record associating one or more templates with one or more network flow data values;
indexing metadata about the one or more Kflow records into a MetaData System (MDS) based on a time interval, a device identifier, and a local server server name;
storing the one or more Kflow records for historical analysis, wherein the storing comprises compiling a preconfigured interval of Kflow records to form a FastKFlow record, and storing the FastKFlow record for historical analysis;
processing Kflow records as key/value pairs;
comparing the key/value pairs to rules identifying alarm conditions;
receiving a Structured Query Language (SQL) query;
breaking the SQL query into one or more subqueries such that there is one subquery per device per time interval covered by the SQL query;
identifying, through the MDS, one or more storage servers containing data records for the particular device and time interval of each subquery;
sending each subquery to an identified, available, and least loaded storage server;
checking, by each storage server, for relevant subquery results in a server cache, and, if not in the server cache, queuing the subquery for retrieving results from disk; and
updating, by each storage server, the storage server cache for retrieved results and copying the cached results to any additional nodes in the clustered computer server hardware.

3. The method of claim 2, wherein the transmitted network flow and BGP data includes data received from Agent software, and further comprising:
  listening, by the Agent software, to UDP traffic on the computer network;
  querying the KDE for device information identified in the UDP traffic;
  forking a separate Agent process for each unique device detected in the UDP traffic;
  transforming, by the separate Agent process for a unique device, UDP traffic for the unique device into the one or more Kflow records;
  launching, by the separate Agent process for the unique device, a BGP daemon for the unique device;
  polling, by the Agent process, network devices on the computer network for SNMP data;
  merging BGP data collected by the BGP daemon and SNMP data into the one or more Kflow records; and
  posting the one or more Kflow records over the internet from the Agent software to a VIP of the KDE.

4. The method of claim 2, wherein processing and comparing further comprise:
  processing Kflow records into an alpha flow of data tuples comprising at least a source Internet Protocol (IP) address, a destination IP address, a source port, a destination port, a protocol, a number of bytes, and a set of packet data;
  processing the alpha flow into a beta flow of key value pairs; and
  comparing beta flow to one or more trigger rules for alert conditions based on values for given keys in the trigger rules.

5. The method of claim 4, further comprising:
  processing a top set of keys by value for retention;
  writing a history of retained beta flows to a history database on a large time period interval of one hour or longer; and
  identifying deviations in beta flow values of the retained beta flows with values in the history database for alerts from historical usage patterns separately from trigger rules.

6. A system for a clustered architecture real-time network traffic capture and analysis, comprising:
  one or more computer devices within the computer network having computer readable non-transitory media storing Agent software programmed to:
    listen to User Datagram Protocol (UDP) traffic on the computer network;
    query a Kentik Data Engine (KDE) for device information identified in the UDP traffic;
    fork a separate Agent process for each unique device detected in the UDP traffic;
    transform, by the separate Agent process for a unique device, UDP traffic for the unique device into the one or more Kflow records, each Kflow record associating one or more templates with one or more network flow data values;
    launch, by the separate Agent process for the unique device, a Border Gateway Protocol (BGP) daemon for the unique device;
    poll network devices on the computer network for Simple Network Management Protocol (SNMP) data;
    merge BGP data collected by the BGP daemon and SNMP data into the one or more Kflow records; and
    post the one or more Kflow records over the internet to a Virtual Internet Protocol (VIP) address of the KDE;
  one or more router devices within the computer network configured to transmit UDP and BGP data to the KDE; and
  clustered computer server hardware having computer readable non-transitory media storing software for the KDE programmed to:
    receive Kflow records from Agent processes;
    initiate a KDE child process for each router device;

receive, by the KDE child process, transmitted BGP data from the router device;

gather, by the KDE child process, Domain Name Service (DNS) data and SNMP data of the router device; and integrate, by the KDE child process, the UDP, BGP, DNS, and SNMP data into the one or more Kflow records;

poll Hyper Text Transfer Protocol (HTTP) logs, SNMP data, DNS data, and geolocation data, related to the computer network;

merge the received and polled data with the one or more Kflow records;

compile a preconfigured interval of Kflow records to form a FastKFlow record, and store the FastKflow record for historical analysis;

index metadata about Kflow records into a Metadata System (MDS) based on a time interval, a device identifier, and a local server server name;

receive a Structured Query Language (SQL) query;

break the SQL query into one or more subqueries such that there is one subquery per device per time interval covered by the SQL query;

identify, through the MDS, one or more storage servers containing data records for the particular device and time interval of each subquery;

send each subquery to an identified, available, and least loaded storage server;

check, by each storage server, for relevant subquery results in a server cache, and, if not in the server cache, queuing the subquery for retrieving results from disk;

update, by each storage server, the storage server cache for retrieved results and copying the cached results to any additional nodes in the clustered computer server hardware;

process Kflow records into an alpha flow of data tuples comprising at least a source IP address, a destination IP address, a source port, a destination port, a protocol, a number of bytes, and a set of packet data;

process the alpha flow into a beta flow of key value pairs;

compare beta flow to one or more trigger rules for alert conditions based on values for given keys in the trigger rules;

process a top set of keys by value for retention;

write a history of retained beta flows to a history database on a large time period interval of one hour or longer; and identify deviations in beta flow values of the retained beta flows with values in the history database for alert from historical usage patterns separately from trigger rules.

7. A system for a clustered architecture real-time network traffic capture and analysis, comprising:

clustered computer server hardware having computer readable non-transitory media storing software for a Kentik Data Engine (KDE) programmed to:

receive network flow and Border Gateway Protocol (BGP) data from a computer network, wherein the computer network comprises one or more computer devices having computer readable non-transitory media storing Agent software programmed to transmit network flow and BGP data to the KDE from the Agent software, or one or more router devices configured to transmit network flow and BGP data to the KDE;

poll Hyper Text Transfer Protocol (HTTP) logs, Simple Network Management Protocol (SNMP) data, Domain Name Service (DNS) data, and geolocation data, related to the computer network;

merge the received and polled data into one or more Kflow records, each Kflow record associating one or more templates with one or more network flow data values;

store the received and polled data for historical analysis;

process Kflow records into an alpha flow of data tuples comprising at least a source Internet Protocol (IP) address, a destination IP address, a source port, a destination port, a protocol, a number of bytes, and a set of packet data;

process the alpha flow into a beta flow of key value pairs; and compare beta flow to one or more trigger rules for alert conditions based on values for given keys in the trigger rules;

process a top set of keys by value for retention;

write a history of retained beta flows to a history database on a large time period interval of one hour or longer; and identify deviations in beta flow values of the retained beta flows with values in the history database for alerts from historical usage patterns separately from trigger rules.

8. The system of claim 7, wherein the Agent software stored by the one or more computer devices is further programmed to:

listen to UDP traffic on the computer network;

query the KDE for device information identified in the UDP traffic;

fork a separate Agent process for each unique device detected in the UDP traffic;

transform, by the separate Agent process for a unique device, UDP traffic for the unique device into the one or more Kflow records;

launch, by the separate Agent process for the unique device, a BGP daemon for the unique device;

poll network devices on the computer network for SNMP data;

merge BGP data collected by the BGP daemon and SNMP data into the one or more Kflow records; and post the one or more Kflow records over the internet to a Virtual Internet Protocol (VIP) address of the KDE.

9. The system of claim 7, wherein the one or more router devices configured to transmit network flow and BGP data to the KDE are further configured to transmit UDP data to a virtual internet protocol (VIP) address of the KDE, and wherein the software for the KDE is further programmed to:

initiate a KDE child process for each router device;

received, by the KDE child process, transmitted BGP data from the router device;

gather, by the KDE child process, DNS data and SNMP data of the router device; and integrate, by the KDE child process, the UDP, BGP, DNS, and SNMP data into the one or more Kflow records.

10. The system of claim 7, wherein the software for the KDE is further programmed to: compile a preconfigured interval of Kflow records to form a FastKFlow record, and store the FastKFlow record for historical analysis.

11. The system of claim 10, wherein the software for the KDE is further programmed to index metadata about received data into a Metadata System (MDS) based on a time interval, a device identifier, and a local server server name.

12. The system of claim 11, wherein the software for the KDE is further programmed to:
receive a Structured Query Language (SQL) query;
break the SQL query into one or more subqueries such that there is one subquery per device per time interval covered by the SQL query;
identify, through the MDS, one or more storage servers containing data records for the particular device and time interval of each subquery;
send each subquery to an identified, available, and least loaded storage server;
check, by each storage server, for relevant subquery results in a server cache, and, if not in the server cache, queuing the subquery for retrieving results from disk; and
update, by each storage server, the storage server cache for retrieved results and copying the cached results to any additional nodes in the clustered computer server hardware.

* * * * *

UNITED STATES PATENT AND TRADEMARK OFFICE
CERTIFICATE OF CORRECTION

PATENT NO. : 9,942,253 B2
APPLICATION NO. : 15/404623
DATED : April 10, 2018
INVENTOR(S) : Avraham Tzur Freedman et al.

Page 1 of 1

It is certified that error appears in the above-identified patent and that said Letters Patent is hereby corrected as shown below:

On the Title Page (73), replace "Kentlik Technologies, Inc." with --Kentik Technologies, Inc.--.

(60), replace "filed on Jan. 15, 216" with --filed on Jan. 15, 2016--.

Signed and Sealed this
Fifteenth Day of October, 2019

Andrei Iancu
*Director of the United States Patent and Trademark Office*